(12) United States Patent  (10) Patent No.: US 8,013,244 B1
Chumacero  (45) Date of Patent: Sep. 6, 2011

(54) LOCKABLE INSERT FOR WIRE ACCESS PIT

(76) Inventor: Francisco J. Chumacero, Riverside, CA (US)

( * ) Notice: Subject to any disclaimer, the term of this patent is extended or adjusted under 35 U.S.C. 154(b) by 233 days.

(21) Appl. No.: 12/387,578

(22) Filed: May 5, 2009

Related U.S. Application Data

(63) Continuation-in-part of application No. 12/228,111, filed on Jul. 31, 2008, now Pat. No. 7,683,256.

(60) Provisional application No. 61/130,155, filed on May 29, 2008.

(51) Int. Cl.
*H01H 9/02* (2006.01)

(52) U.S. Cl. .............. 174/58; 174/66; 174/67; 248/906; 439/535

(58) Field of Classification Search .................... 174/50, 174/58, 66, 67; 220/4.02, 241, 242; 248/906; 439/535
See application file for complete search history.

(56) References Cited

U.S. PATENT DOCUMENTS

| | | | | |
|---|---|---|---|---|
| 3,288,910 | A * | 11/1966 | Zerwes | 174/53 |
| 4,381,063 | A * | 4/1983 | Leong | 220/242 |
| 5,072,846 | A | 12/1991 | Portwood | |
| 5,571,023 | A * | 11/1996 | Anthony | 439/142 |
| 5,675,126 | A * | 10/1997 | Halvorsen | 174/67 |
| 5,779,083 | A * | 7/1998 | Bordwell | 220/242 |
| 5,800,188 | A * | 9/1998 | Barber et al. | 439/142 |
| 6,583,359 | B1 * | 6/2003 | Cabello-Colon | 174/66 |
| 7,234,634 | B1 | 6/2007 | Payne et al. | |

OTHER PUBLICATIONS

McCain Vandal Resistant Pull Box Insert, www.mccain-inc.com website; 14 pages; dated Jun. 1, 2008.

* cited by examiner

*Primary Examiner* — Dhiru R Patel
(74) *Attorney, Agent, or Firm* — Law Offices of David L. Hoffman

(57) ABSTRACT

A protective insert for wires in a junction box is formed by a lockable cover having a frame with an opening and a pivotable cover for covering the opening. The frame is sized to rest on an inner lip of the box, which lip normally holds a lid for the box. The lid rests on the lockable cover. The cover may be pivoted open for access to wires in the junction box and may be pivoted closed, and locked, to protect the wires from theft or vandalism. The lockable cover is held down on the lip preferably by chains fixed to the frame with stakes fixed to a free end of the chains, and by pounding the stakes into the ground at the bottom of the box. In another embodiment, there is a lock. Further, the insert is anchored to the box by J-shaped hooks. In a further embodiment, the insert is anchored by an elongated rod with curled up ends, and may be set in concrete around the box.

17 Claims, 12 Drawing Sheets

FIG. 9
FIG. 10
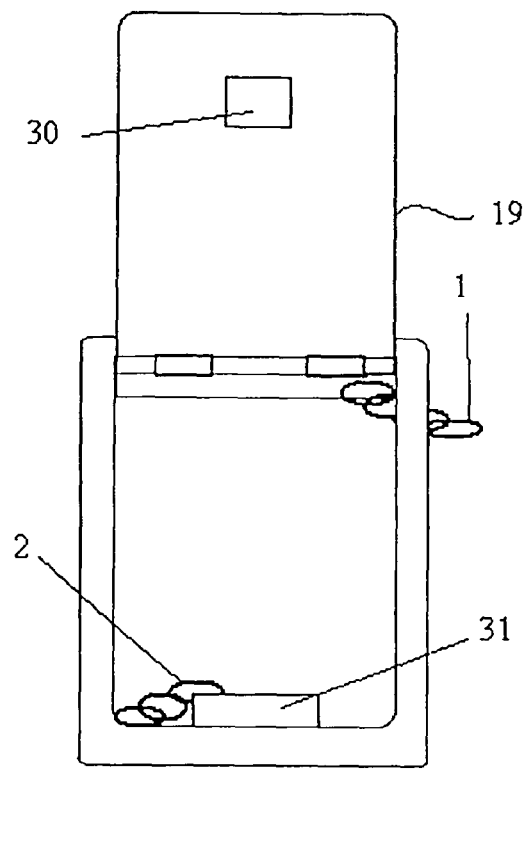
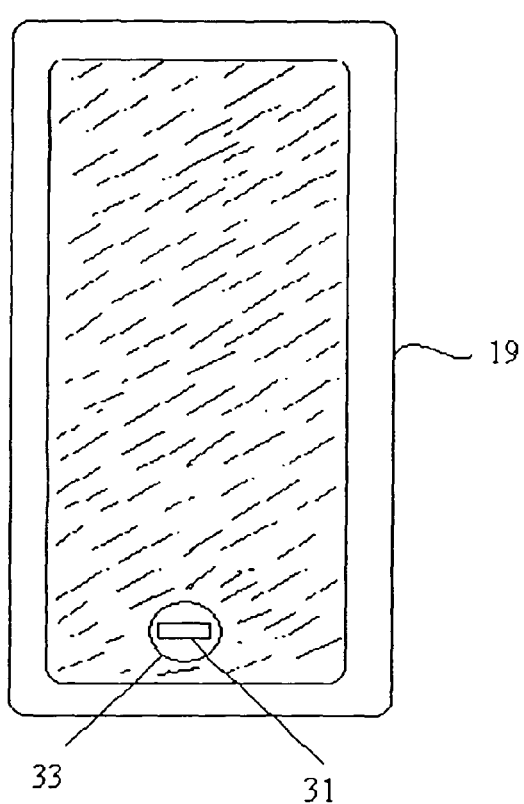

FIG. 11
FIG. 12
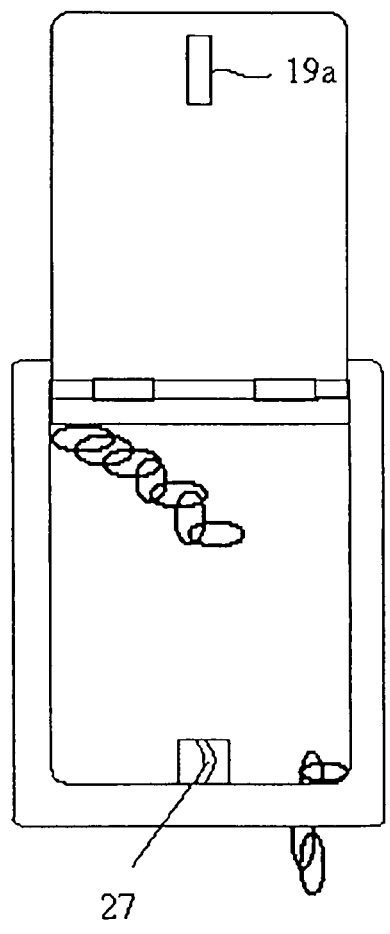
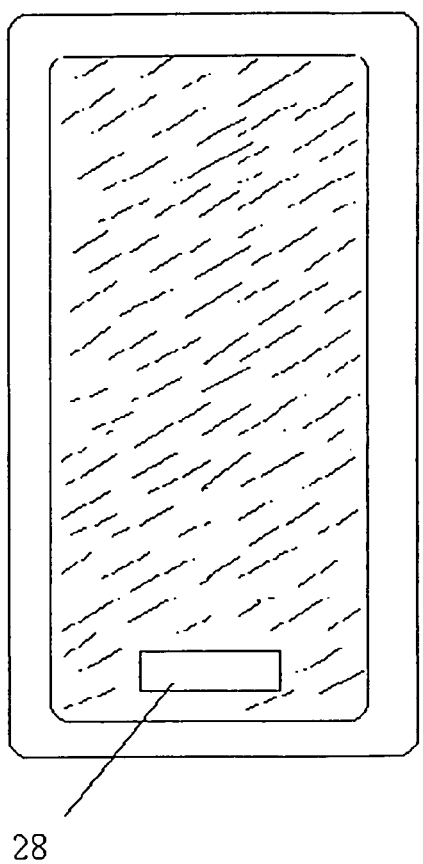

8,013,244 B1

LOCKABLE INSERT FOR WIRE ACCESS PIT

CROSS REFERENCE TO RELATED APPLICATION(S)

This application is a continuing application (continuation in part) of U.S. patent application Ser. No. 12/228,111 filed Jul. 31, 2008, now U.S. Pat. No. 7,683,256 claims priority therefrom and the U.S. patent application claims priority from U.S. Provisional Patent Application No. 61/130,155, filed May 29, 2008, both the U.S. patent application and the Provisional Application being incorporated by reference herein.

FIELD OF THE INVENTION

The present invention relates to a lockable insert for a junction box and preferably for an in ground junction box.

BACKGROUND OF THE INVENTION

In recent years the cost of copper, e.g., copper wire, has increased greatly. Such increases have given rise to thieves stealing copper wire from junction boxes such as those for lighting. Typically, there are in ground junction boxes with copper wires adjacent or proximate virtually every outdoor light post, and other outdoor electrical devices.

When wire is stolen from a box, there is not only the cost of new wire, but also the much larger cost of skilled electricians to rewire the light. There is also a safety hazard due to the light being out, and due to free ends of remaining wire.

One solution that has been used is to replace the entire box with a lockable box. This is extremely expensive. The boxes are formed by a large concrete rectangular block that is in a hole in the ground. The cost of the box and the labor to replace the box is very expensive. Therefore, such a solution is too expensive.

Another solution is to thread the incoming wire into a lockable cylindrical member that essentially squeezes the incoming wires inside it. However, in that case thieves cut the wires at the point of entry into the cylinder, and pull the remaining wires out, necessitating the same or more electrical repair and time than if there were no locking device at all.

A further solution has been proposed for a "vandal resistant pull box insert." Such an insert is offered for sale at www.M-cCain-inc.com. The insert is a rectangular panel that just fits within the inner dimensions of a pull box. The panel sits on two inverted U-shaped brackets that are friction fit into the pull box. There is ground hardware. The panel locks to one of the brackets. This insert does not use the lip of the pull box as a mounting surface. Moreover, this insert appears to be able to be pulled out. Further, because of the position of the insert it has the grounding hardware. Installation involves pulling existing wires out of the way and normally out of the pull box. There is significant shock hazard.

SUMMARY OF THE INVENTION

In one embodiment, the present invention provides a secure lockable insert which is easy to retrofit on any box, without any electrical work and without the need to dig up, remove and replace the existing box. The insert includes a frame that goes rests on the inner lip of a existing in-ground junction box, underneath the cover, as well as a flap that is connected to the frame. The flap has two tubes that are welded to it at one end. The tubes receive a rod that extends from one side of the frame to the other, creating a hinge. The frame also has a tab that fits through a slot in the flap when the flap is in the closed position. The tab and slot are located at the opposite end from the hinge. The tab has an aperture for receiving a pad lock that can then be put on the tab to prevent the flap from opening. The pre-existing cover will then rest on top of the insert.

In another embodiment, there is a lock. Further, the insert is anchored to the box by J-shaped hooks. In a further embodiment, the insert is anchored by an elongated rod with curled up ends, and may be set in concrete around the box.

BRIEF DESCRIPTION OF THE DRAWINGS

FIG. 9 is a perspective view of the lockable insert showing its frame and showing the rotatable cover in the open position;

FIG. 10 is a perspective view of the lockable insert showing the rotatable cover in the closed position;

FIG. 11 is a perspective view of a lockable insert of another embodiment of the invention, showing its frame and showing its rotatable cover in the open position;

FIG. 12 is a perspective view of the lockable insert of FIG. 11 showing the rotatable cover in the closed position;

DESCRIPTION OF THE PREFERRED EMBODIMENT(S)

Figure 1:
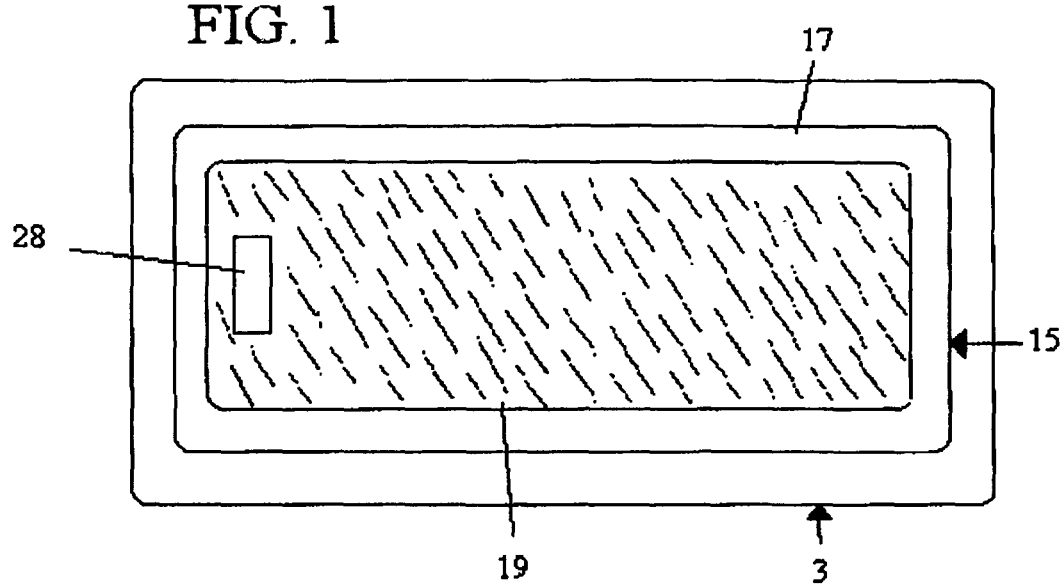
FIG. 1 is a top view of a lockable insert for a junction box in accordance with a first embodiment of the invention.
Figure 3:
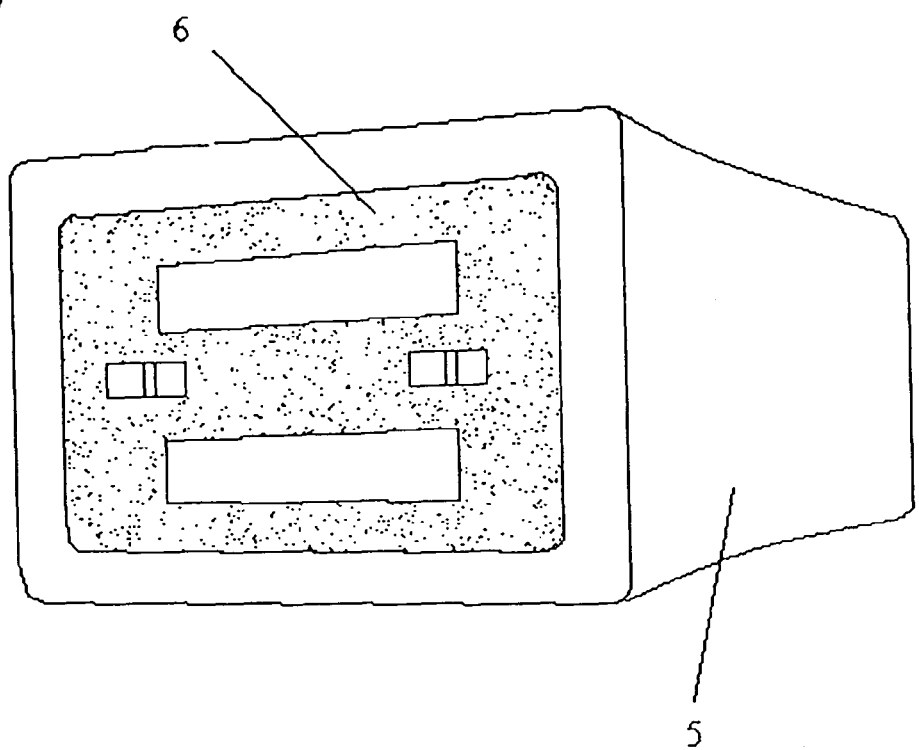
FIG. 3 is a top perspective view of a conventional junction box with its cover in place, which may have a lockable insert in accordance with the invention therein.

In FIG. 1, an outdoor, in ground junction box is shown from the top, with its lid removed. Junction box 3 has a concrete substantially rectangular block formed by walls 5 (FIG. 3). Box 3 has a lid 6 that sits on an interior lip 6a (FIG. 4).

The box is set in the ground and provides a place for connecting wires and/or access to wires that are underground, such as for street lights. As shown by FIG. 4, a junction box 3 may have wires 37 connected to another junction box 3 or a series of boxes in the event of a long run. The wires 37 go from a junction box 3 also to a power source such as a transformer 10. The simplest arrangement is normally from a transformer to a junction box to a street light.

Figure 4:
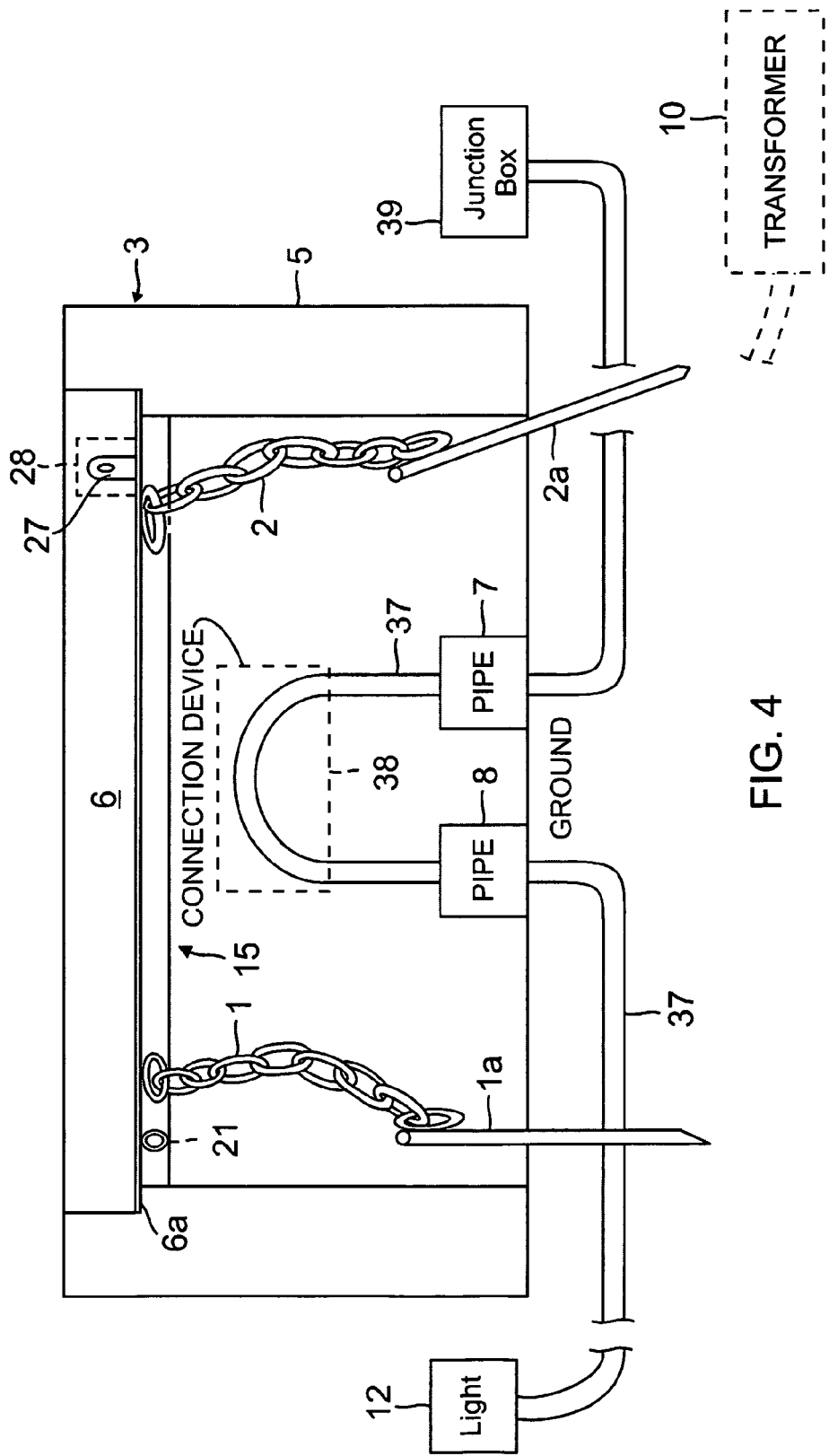
FIG. 4 is a side partial schematic view of a junction box with the lockable insert of the invention.

In FIG. 4, wires 37 may come from a transformer 10 to box 3, entering through a pipe 7 or conduit and exiting through another pipe 8 or conduit, and then on to a street light 12.

Figure 7:
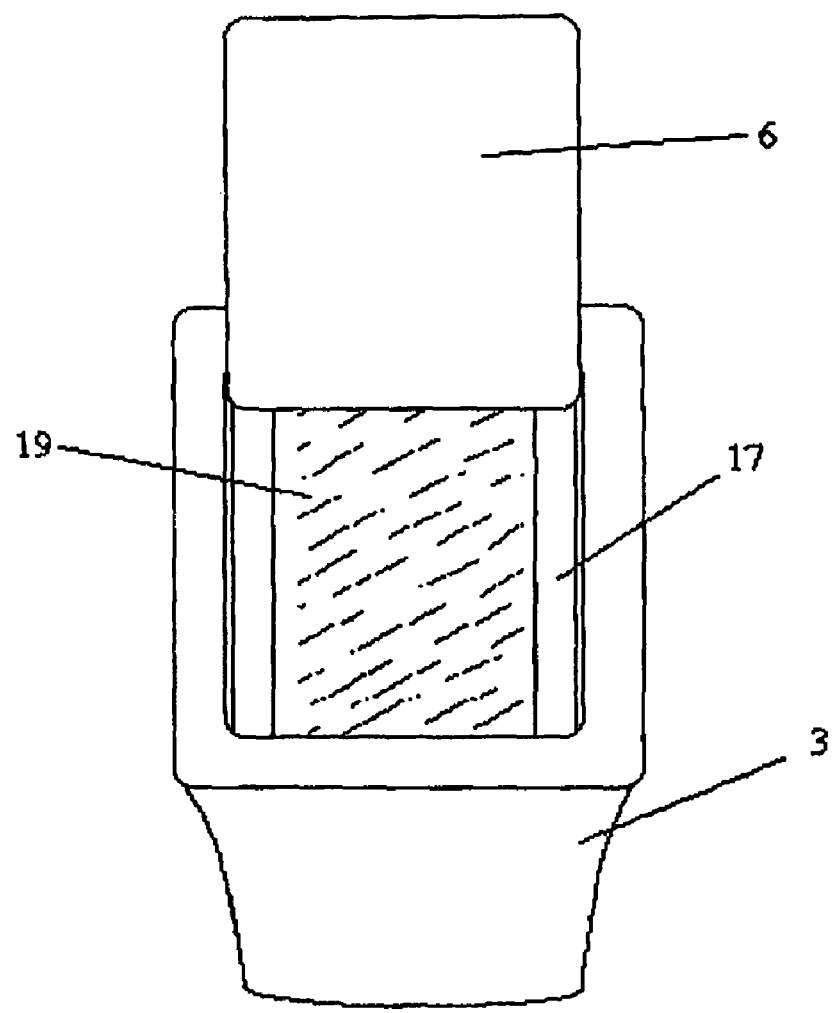
FIG. 7 is a perspective view of a junction box with the lockable insert in it, and with its rotatable cover in the closed position, and with the junction box lid rotated upward.
Figure 8:
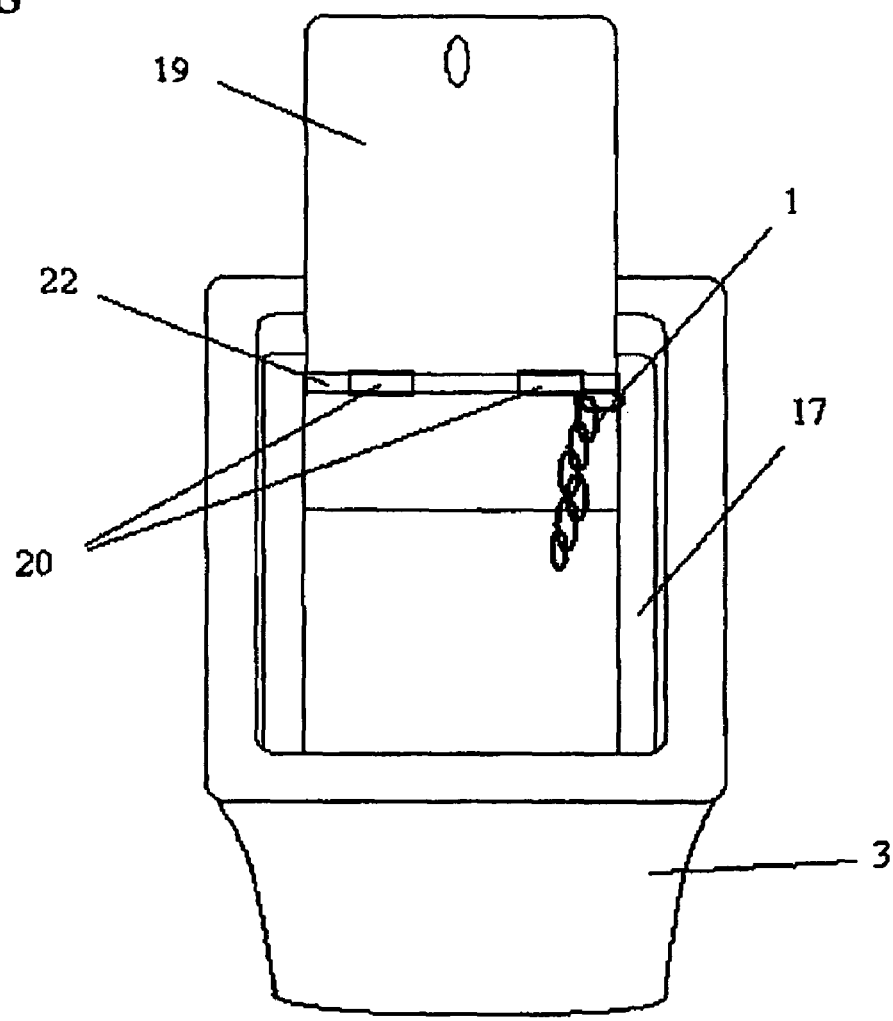
FIG. 8 is a perspective view like that of FIG. 7, with the junction box lid removed and the rotatable cover in the open position.
Figure 13:
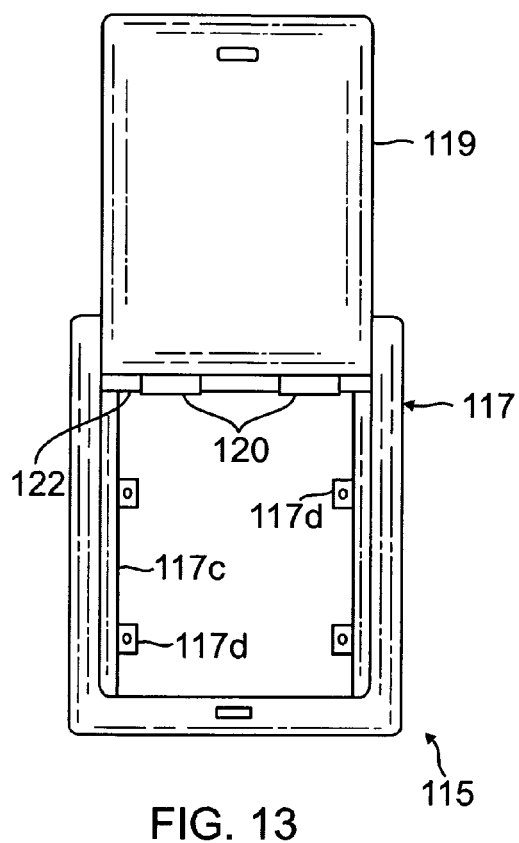
FIG. 13 is a perspective view of the lockable insert of a further embodiment showing its frame and showing the rotatable cover in the open position.
Figure 14:
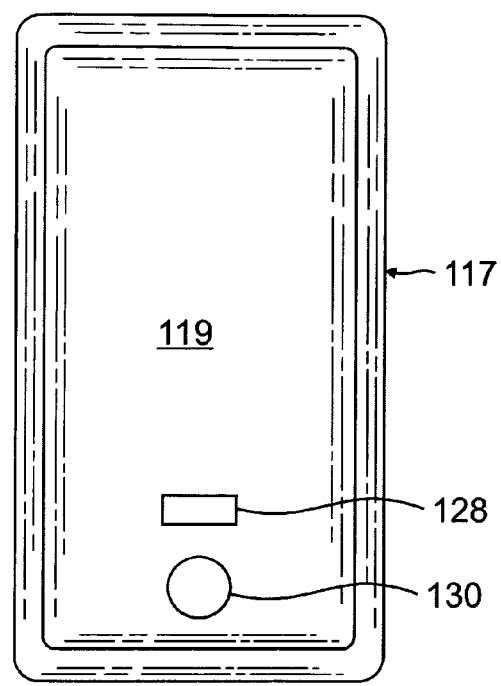
FIG. 14 is a perspective view of the lockable insert showing the rotatable cover in the closed position.
Figure 15:
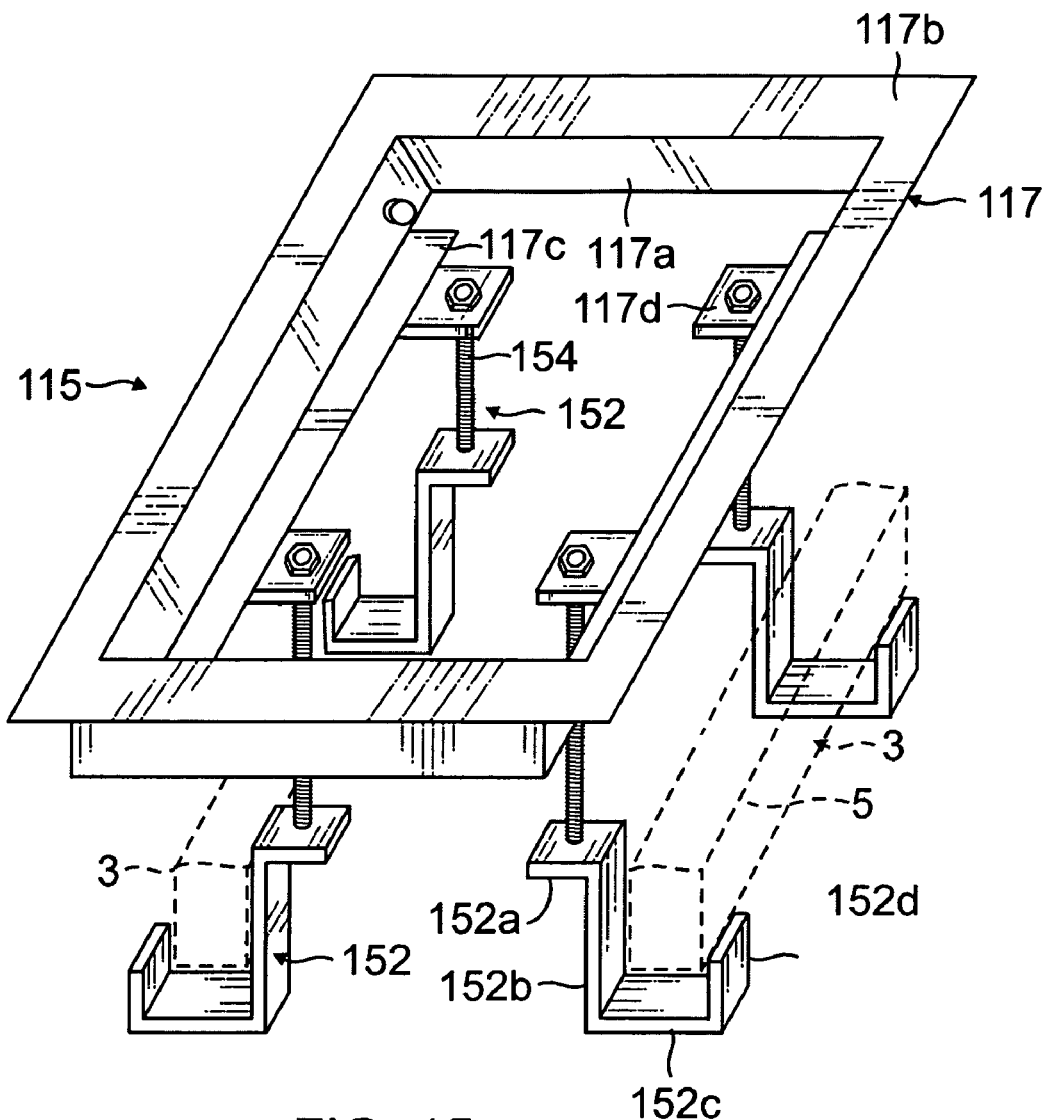
FIG. 15 is a perspective view of a lockable insert of FIG. 13 showing its frame with the cover removed.
Figure 16:
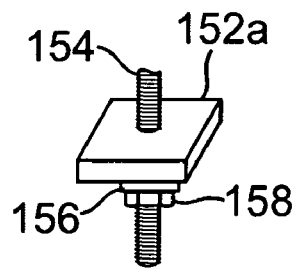
FIG. 16 is an enlarged view of a connection of a bolt and hook shaped member shown in FIG. 15.
Figure 17:
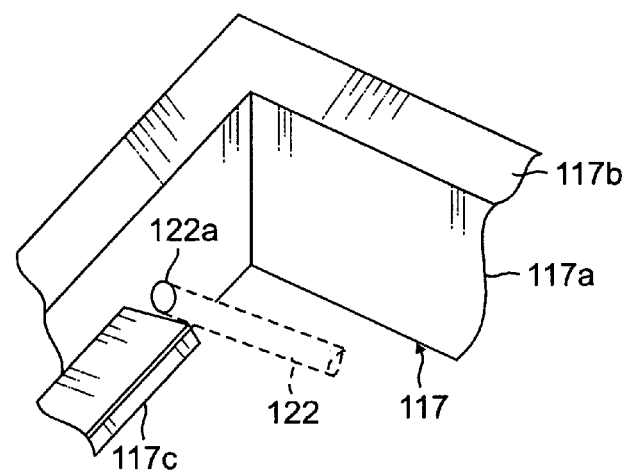
FIG. 17 is an enlarged perspective view of a portion of the lockable insert showing details of the frame and showing a rod for the rotatable cover.

Conventionally, lid 6 typically sits on the lip 6a and can simply be pulled up, usually by rotating the lid to a position such as shown in FIG. 7. Then one may grab each side of the lid and fully remove it.

Figure 5:
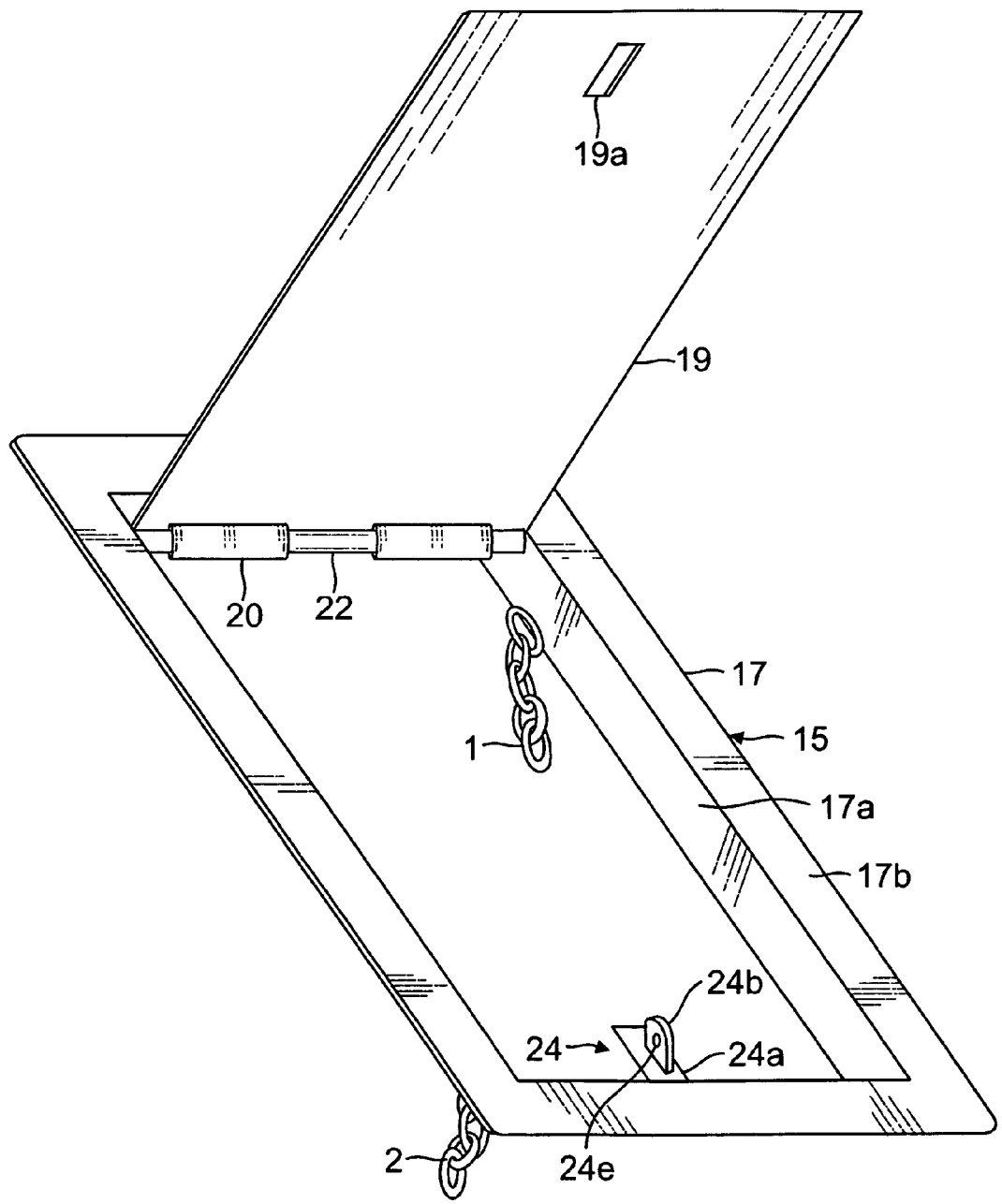
FIG. 5 is a top perspective view of the lockable insert of the invention with its rotatable cover in an open position.

As shown in FIG. 5, lockable insert 15 has an outer rectangular frame 17 and a rotatable cover 19. Cover 19 has tubes 20 (or just one tube) that are near one end and slide over a rod 22. Rod 22 may be welded to an inner vertical flange 17a of frame 17.

There may be holes at portions of flange 17a that the rod may pass slightly through for additional support. The frame 17 has a horizontal flange 17b which sits on lip 6a of box 3.

Figure 2:
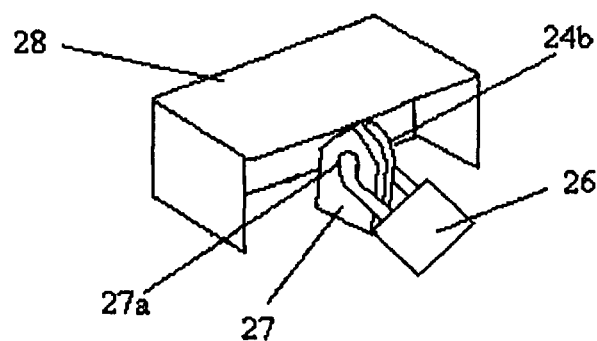
FIG. 2 is an enlarged perspective view of a handle and lock of the lockable insert of FIG. 1.

The tubes 20, best seen in FIG. 5, may be welded to cover 19. Cover 19 rotates on rod 22, and fits within frame 17. Cover 19 is stopped from rotating by a tab 24 at the other end of the frame from rod 22. Tab 24 has a plate 24a and an upright projection 24b with an aperture 24e therein. Cover 19 has a slot 19a in a position corresponding to the projection's position. When the cover is closed, the projection 24b extends through the slot 19a, sufficiently so that the aperture is accessible from above the cover. As shown in FIG. 2, in this way a padlock 26 may be placed through aperture 24e and through an aperture 27a in another projection 27 fixed to the top of the rotatable cover adjacent the slot. There may be a handle 28 on cover 19 covering the projections 24b and 27 to help protect them, and to allow one to easily pull up cover 19. Therefore, cover 19 may be rotated up, after removing the padlock 26, to a position past ninety degrees, so that it will stay open (see FIGS. 9 and 11).

To secure lockable insert 15 to the junction box, several methods may be used. For example, flange 17a may be bolted into the concrete walls 5. It is preferred, however, to secure, e.g., by welding, a chain or chains 1, 2 to the underside of the flange 17b and/or 17a. The other end of the chains are secured to rods or stakes 1a and 2a seen in FIG. 4. The stakes in turn are pounded into the ground. This makes installation of the lockable cover very quick and easy. All one needs to do is open the box, take off the lid completely, lay the lockable cover with flange 17b onto the lip 6a of the box, open the cover of the lockable insert, and pound the stakes into the ground. Then the cover may be closed and locked.

Another version of the lockable insert uses a key lock. As shown in FIGS. 9 and 10, a lock mechanism 30 is fixed to the underside of cover 19. A projecting plate 31 is fixed to the frame in place of projection 24. In FIG. 10, cover 19 is rotated down to the closed position. A key hole 31 projects into cylinder 33 passing through the cover 19. Using a key to turn the lock, a locking tab extends from lock mechanism 30 under plate 31, so cover 19 cannot be pulled up. To unlock just rotate the key in the opposite direction. There may be a handle in this embodiment too, or the key may be used to pull up on the cover to rotate it to the open position.

Figure 6:
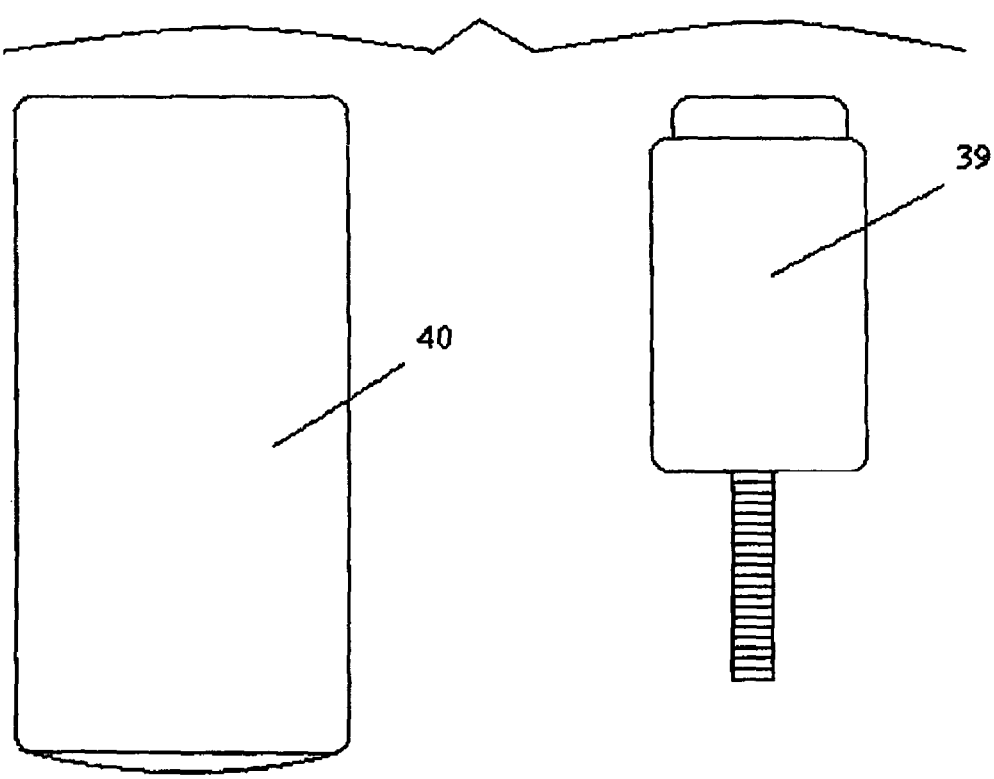
FIG. 6 is a view of a conventional copper wire holder known as a "Copper Keeper"

As shown in FIG. 6, a "Copper Keeper" or equivalent may be used as a device 38 to connect the wires and/or to help prevent theft. The wires enter the device in vertical slots (not shown) at about ninety degrees from each other on core 39, and core 39 is inserted into outer member 40. Turning a screw on core 39 causes portions of core 39 to expand and friction fit inside outer member 40.

Accordingly, in one embodiment, the invention is a combination of the above described junction box and the lockable insert, including the junction box 3, the box having four walls 5, each of the four walls 5 having the inner lip 6a, and the box having the removable lid 6, and the lockable insert 15 having the frame 17 for resting on the lip between the lip 6a and the lid 6, the frame defining an opening in a central portion thereof, a mechanism (e.g., in this embodiment, the stakes and the chains) for holding the frame down against the lip, the cover 19 movably mounted to the frame for selectively covering the opening at the central portion of the frame; and a mechanism for locking the cover to the frame 17 with the cover 19 covering the opening (e.g., in this embodiment, the tabs 27 and 24b, which may then be locked together with padlock 26).

A further embodiment of the lockable insert is shown in FIGS. 13-17. In this embodiment, the lock may be a cylindrical structure, which is commercially available, or of similar structure as before.

In this embodiment, a lockable insert 115 also has a frame 117, and a rotatable cover 119 hinged to the frame. Specifically, a rod 122 fits through a tube or tubes 120 fixed to the cover. Ends of rod 122 are preferably fitted through holes 122a in a vertical flange 117a of frame 117 and is preferably fixed to the frame. Frame 117 also has a horizontal flange 117b that sits on the lip 6a of the junction box 3 (as shown in the prior embodiments).

As in the prior embodiments, there preferably is a handle 128 for the cover and a lock 130.

There is also a horizontal flange 117c at the bottom of sides of the flange 117a which supports tabs 117d. The tabs 117d provide a way to attach bolts 164 to hook-shaped members 152. There are preferably four bolts and four hook-shaped members, but the number can be varied. The hook-shaped members have an upper flange 152a where the bolts are attached with a washer 156 or washers and a nut 158, which may be a lock nut. A locking washer may be used.

The upper flange 152a connects to a long vertical flange 152b, then a lower horizontal flange 152c and then an upwardly depending vertical flange 152d. The shape . of the hook-shaped member facilitates slipping the flange 152d under and around the bottom of the junction box's concrete sides 5 (as shown in phantom in FIG. 15). The flange 152c sits on the ground or may be suspended in the air if the ground is deeper at that point. The hook-shaped members are made to pass through dirt or between the dirt and the concrete sides 5 of the junction box. Therefore, they are useful in a retrofit application, although they may also be used when a new box is placed.

In the attachment method, one may use the same method as above, with the following changes: It may be helpful to loosen the dirt where the hook-shaped members will fit to help them get into position. They are hooked around the bottom of the box, and preferably at this point the bolts are attached to the flange 152a of the hook-shaped members 152. While one could try to fit the hook-shaped members into place with the bolts loosely attached to them, it is easier to position the hook-shaped members first, then attach the bolts.

Figure 18:
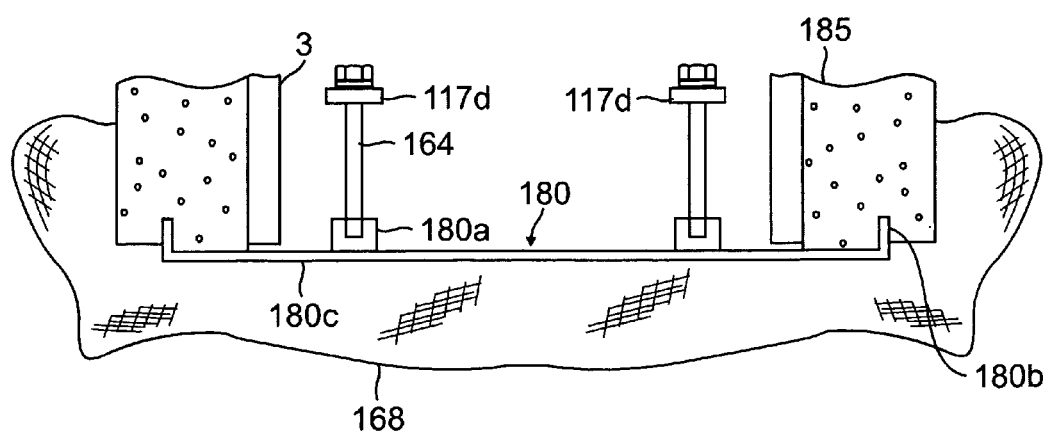
FIG. 18 is a partial side view of an alternative mechanism for anchoring the lockable insert.

In FIG. 18, an alternative anchoring system for the lockable insert is shown. In this embodiment, a long anchor 180 or two long anchors (or more if desired) is fit under the box, before the box is placed, and then concrete 185 is filled around the box. This embodiment is preferably used with a new box installation. While one could dig out an existing box and replace the box after the anchor(s) are positioned, or one could dig under the box to place the anchor(s), those measures are cumbersome and potentially could cause damage to whatever lines, e.g., electrical lines, that are below the box in the ground. Instead of bolts, wires or other elongate fasteners may be used in either embodiment.

In this embodiment, anchor(s) 180 have a tab or tabs 180a fixed thereto for attaching bolts 164 as in the prior embodiment to attach the anchor(s) to the frame. Ends 180b of the anchor(s) are turned upward, and anchor(s) 180 have an elongate body 180c, which may be in rod or bar shape, to extend from within the box and pass below the box to outside the box. The anchor(s) may sit on ground 168 and have the ends fixed in concrete 185 poured around the box.

Installation with a new box includes: digging a hole for the box wider than the box; placing the anchor(s) in place on the ground; setting the box on the anchor(s); putting the lockable insert in place; bolting the anchor(s) to the tabs 117d of the frame; and pouring concrete around the box (or pouring the concrete first, then bolting).

The lockable insert preferably is of materials that will last outdoors, e.g., galvanized metal, stainless steel, or the like. It can also be made of plastic, but the plastic must be very strong to withstand stomping or other attempts to break it. Therefore, metal is preferred.

The above described embodiments of the invention can be varied in many ways. One way is by providing a variation of the locking mechanism. The flange against which the lock engages can be a bent bar (a very shallow U-shape) with each leg fixed to the frame, and having an aperture in the middle of the bar. The locking cylinder can be placed within a case fixed to the underside of the cover, so as to be integral or unitary with the cover. The top of the cylinder would be accessible from the top of the cover, e.g., by an aperture in the cover. The cylinder can thus be "heavy duty" and very difficult to tamper with. The locking tab from the cylinder, when the cylinder is engaged and the lock is engaged, would engage the aperture in the bent bar.

In addition, the cover can be made any size to fit boxes of various sizes, and the cover can be made to essentially make the cover serve as the lid for the box too. In such a case, the cover is preferably sized in thickness to take up from the lip up to a point where it is relatively flush with the top of the box.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A protective insert for a junction box, the protective insert comprising:
   (i) a frame with a pivotably mounted cover,
   (ii) means for securing the frame to a junction box, and
   (iii) means for locking the cover to the frame, wherein the means for securing the frame comprises a plurality of large anchors extending from inside the box, below the box and to outside the box, and means for attaching the large anchors to the frame.

2. The insert of claim 1 wherein the cover is mounted to the frame by at least one tube fixed to an underside of the cover proximate one end of the cover, and a rod mounted to the frame by passing through holes therein, and the rod also passing through the at least one tube, thereby creating a hinge.

3. The insert of claim 1, wherein the means for securing the frame to the junction box comprises dimensioning the frame to rest on an inner lip of the junction box.

4. The insert of claim 1, wherein the means for locking the cover to the frame comprises a tab fixed to the frame and the tab having a vertical portion with an aperture therein.

5. The insert of claim 4, wherein the cover is movable to a closed position in which the cover closes the aperture, and the means for locking the cover further comprises a slot formed in the cover for receiving the vertical portion of the tab whereby when the cover is in the closed position a padlock can be placed through the aperture of the tab.

6. The insert of claim 5, wherein the cover further comprises a flange having an aperture and extending up from the cover adjacent the slot whereby a the padlock may pass through the tab of the cover and the vertical portion of the tab from the frame.

7. The insert of claim 1, wherein the means for securing the frame comprises a plurality of bolts and large hook-shaped elements fixed to the bolts, and wherein the hook-shaped elements include means for fitting under and around the junction box.

8. A combination of a junction box and a lockable insert, wherein the combination comprises:
   (a) a junction box comprising a box having four walls, each of the four walls having an inner lip, and a removable lid for resting on each of the lips; and
   (b) a lockable insert comprising:
       (i) a frame for resting on each of the lips between each of the lips and the lid, the frame defining an opening in a central portion thereof,
       (ii) means for holding the frame down against each of the lips;
       (iii) a cover movably mounted to the frame for selectively covering the opening at the central portion of the frame; and
       (iv) means for locking the cover to the frame with the cover covering the opening.

9. The combination of claim 8, wherein the cover is pivotably mounted to the frame.

10. The combination of claim 8, wherein the cover is pivotably mounted to the frame by fixing at least one tube to the cover and a rod to the frame and the rod passes through the at least one tube.

11. The combination of claim 8, wherein the means for holding the frame down against each of the lips comprises chains fixed to the frame and stakes fixed to the chains.

12. The combination of claim 8, wherein the means for locking the cover comprises a tab fixed to the frame and having a vertical portion with an aperture therein.

13. The combination of claim 8, wherein the means for holding the frame comprises a plurality of bolts and large hook-shaped elements fixed to the bolts, and wherein the hook-shaped elements include means for fitting under and around the junction box.

14. The combination of claim 8, wherein the means for holding the frame comprises a plurality of large anchors extending from inside the box, below the box and to outside the box, and means for attaching the large anchors to the frame.

15. A combination of a junction box and a lockable cover, wherein the junction box is installed in the ground, wherein the combination comprises:
   (a) a junction box comprising a box having four walls, each of the four walls having an inner lip, and a removable lid for resting on each of the lips; and
   (b) a lockable insert comprising:
       (j) a frame for resting on each of the lips between each of the lips and the lid, the frame defining an opening in a central portion thereof, (ii) means for holding the frame down against each of the lips;
(iii) a cover movably mounted to the frame for selectively covering the opening at the central portion of the frame; and
(iv) means for locking the cover to the frame with the cover covering the opening, wherein the junction box is installed in the ground, and the means for holding comprises a plurality of large anchors extending from inside the box, below the box and to outside the box, and means for attaching the large anchors to the frame.

16. The combination of claim 15, wherein the cover is pivotably mounted to the frame.

17. The combination of claim 15, wherein the means for attaching comprises a plurality of nuts and bolts.

* * * * *